United States Patent [19]
Holland

[11] Patent Number: 5,245,985
[45] Date of Patent: Sep. 21, 1993

[54] EFFECTIVE AND SIMPLE SOLAR CONCENTRATOR

[76] Inventor: Beecher J. Holland, 600 Morison Ave., Kingsport, Tenn. 37660

[21] Appl. No.: 787,401

[22] Filed: Nov. 4, 1991

Related U.S. Application Data

[63] Continuation-in-part of Ser. No. 641,788, Jan. 16, 1991, abandoned.

[51] Int. Cl.$^5$ .............................................. F24J 3/02
[52] U.S. Cl. .................................. 126/640; 126/692; 126/694
[58] Field of Search ............... 126/438, 425, 424, 417, 126/694, 692, 640

[56] References Cited

U.S. PATENT DOCUMENTS 4,373,513  2/1983  Materna ..................... 126/435 X
4,815,444  3/1989  Holland ..................... 126/438

Primary Examiner—Larry Jones

[57] ABSTRACT

The present invention is a concentrating solar receiver-converter composed of at least two generally through-shape reflectors whose lengths run essentially north-south and which lean eastward and westward away from each other to a desired extent and each of which contains absorber-converter means residing in the cavity of the reflector, which communicates with energy-receiving means by way of appropriate energy-conveying means.

2 Claims, 1 Drawing Sheet

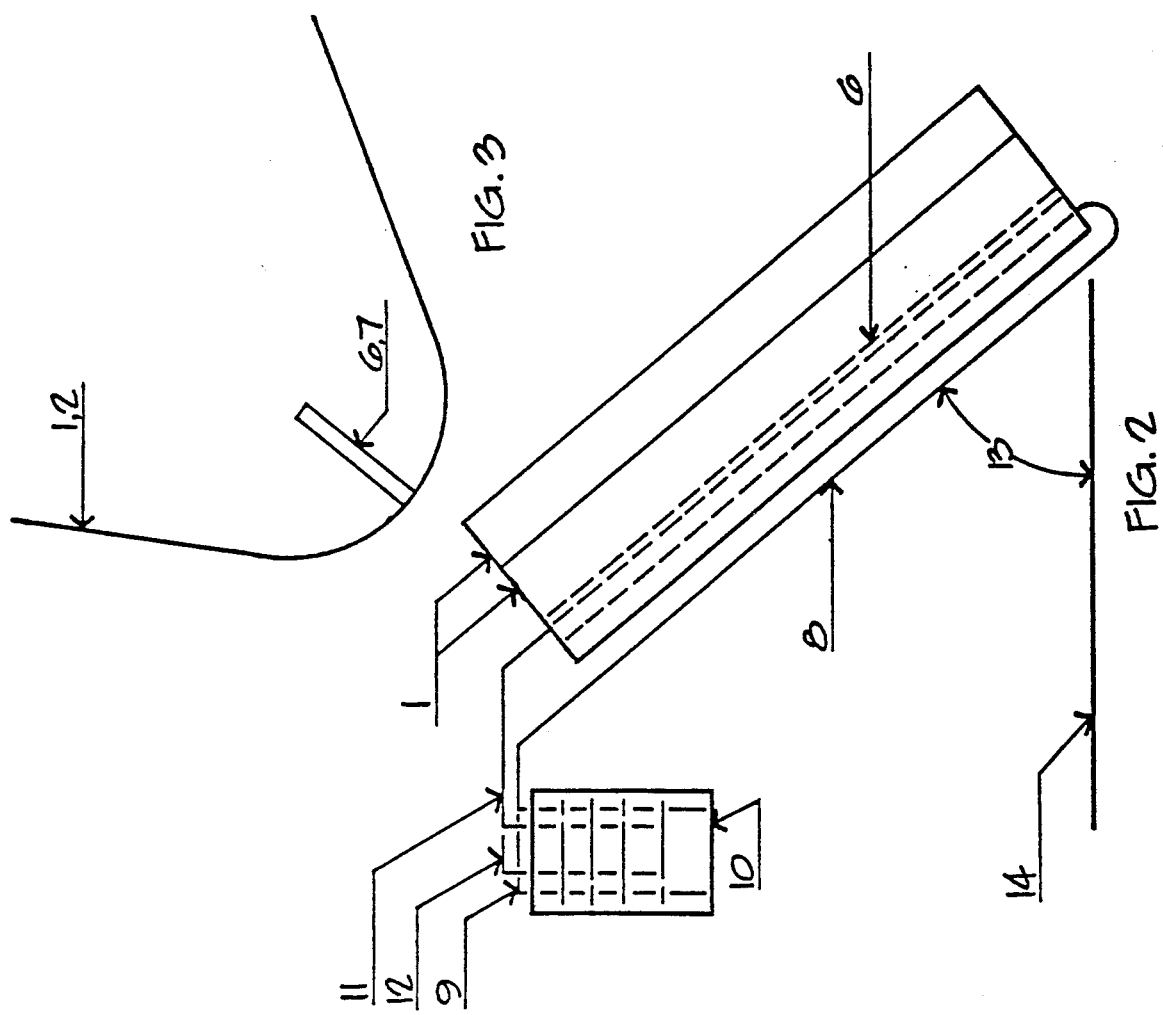
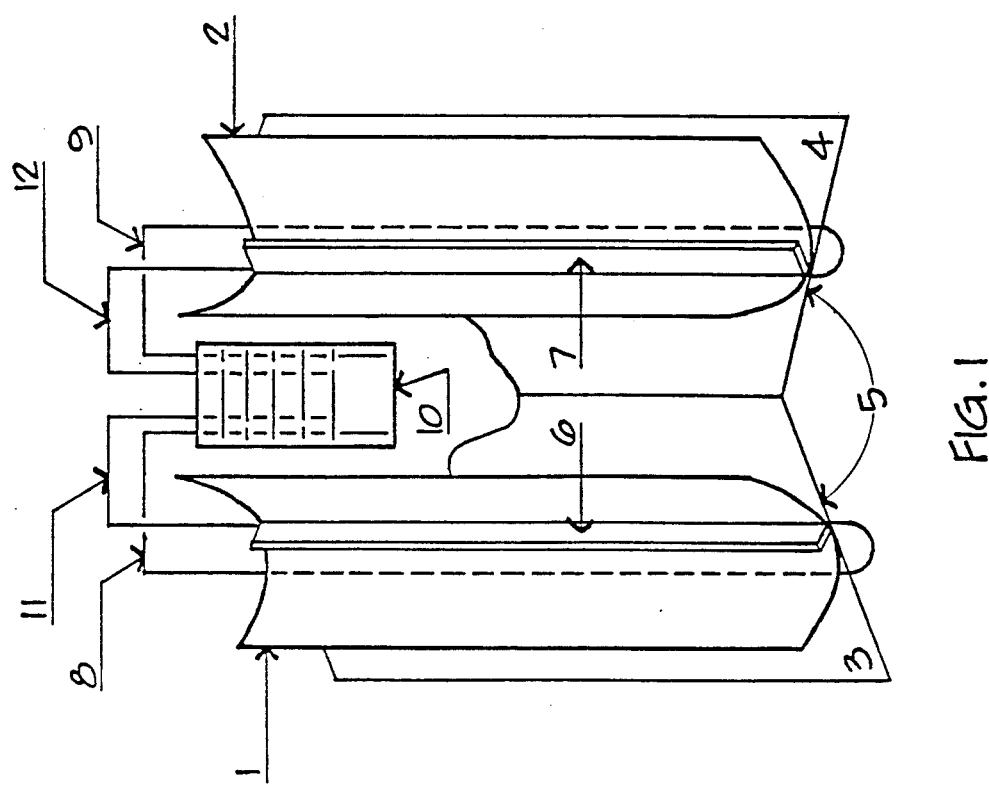

EFFECTIVE AND SIMPLE SOLAR CONCENTRATOR

CONTINUING DATA

This application is a continuation-in-part of U.S. patent application Ser. No. 07/641,788, filed Jan. 16, 1991, titled "An Efficient and Simple Solar Concentrator", now abandoned.

BACKGROUND OF THE INVENTION

The present invention is a concentrating solar colector. U.S. Pat. No. 4,815,444 is a related device by Holland and differs from the present invention, in part, in orientation of the troughs. The difference in orientation is significant in that tests have shown that the present invention, in one embodiment, is capable of attaining a higher temperature in the reservoir than its comparable device under the above U.S. patent, a result which does not appear obvious without testing or analytical studies. Further, the same embodiment uses a more simple tubing arrangement.

The primary object of the present invention is to improve performance compared to that of the above-mentioned patented device. Two further objectives are to simplify the equipment to improve on amenability to production as a preassembled unit to be positioned on a suitable foundation and to further embrace the possible application to photovoltaic and to thermal and to combined thermal and photovoltaic uses.

SUMMARY OF THE INVENTION

The present invention, a concentrating solar receiver-converter, consists of at least two solar concentrators acting as an assembly, with the reflector portions of the solar concentrators being of generally trough-shape cross-section wherein the lengths of the troughs extend generally north and south with at least one trough setting on each of two east-west-extending, intercepting planes wherein the cross-sectional centerline of each trough is essentially perpendicular to its respective plane and the line of intersection of the two planes runs essentially north-south and each of the two planes leans downward from their line of intersection so that the included angle between the two planes on their undersides is less than 180 degrees and wherein there may be more than one set of intercepting planes and their respective concentrators, and wherein the said assembly leans essentially northward when located in the northern hemisphere and essentially southward when located in the southern hemisphere at an angle with the horizontal which is fixed for performance over some fraction of the year and is adjustable for higher performance and wherein absorber-converter means resides in the cavity formed by each trough and energy-conveying means communicate with appropriate areas of the absorber-converter means and energy-receiving means.

A working scale model of an embodiment of the present invention has been tested.

BRIEF DESCRIPTION OF THE DRAWING

The object, design and functioning of the present invention will be clarified hereinafter by an embodiment of the invention described by this specification with reference to the accompanying three drawings for which like item numbers refer to the same items in all three drawings:

FIG. 1 is a front view of the present invention from south.

FIG. 2 is a side view from the west with items 1 and 2 leaning northward (item 2 and item 7 do not show up separately).

FIG. 3 is a cross-sectional view of either item 1 or item 2 with item 6 or item 7 in place as described by U.S. Pat. No. 4,266,858.

DESCRIPTION OF THE PREFERRED EMBODIMENT

An embodiment of the present invention is shown by FIGS. 1, 2 and 3 and is comprised, in part, of two solar concentrators with a cross-section as described by U.S. Pat. No. 4,266,858 and shown by FIG. 3. In detail, the embodiment is comprised, in part, of two through-shape solar reflectors items 1 and 2, the lengths of which extend essentially north-south and the cross-sectional centerlines of which are essentially perpendicular to the respective planes items 3 and 4 whose line of intersection extend essentially north-south and which include an angle item 5 between their undersides of less than 180 degrees. The embodiment also consists of absorber-converter conduits, the first type conduits, items 6 and 7, setting in the cavities formed by the reflectors and of second type conduits (energy-conveying means) items 8 and 9 which feed cooler fluid from the reservoir (energy-receiving means) item 10 to the lower extremities of the first type conduits and of third type conduits (energy-conveying means) items 11 and 12 which transfer hotter fluid from the upper extremities of the first conduits to the reservoir (also a constituent). The two concentrators positioned on their respective planes are treated as an assembly which leans northward as in FIG. 2 by a chosen angle item 13 with the horizontal item 14.

A working scale model of the embodiment has been built and operated. In actual practice, as with the scale model, the reservoir, parts of the conduits and parts of the reflectors would be insulated and the reflector apertures would be covered with a material that passes light.

Operation of the embodiment may be understood with reference to FIGS. 1 and 2. The morning sun enters the eastward-leaning reflector item 2 and concentrates on the absorber (first conduit) item 7, heating the liquid contents of item 7. Resulting thermal expansion of the liquid reduces its density and makes the liquid in the absorber and the third conduit item 12 lighter than earlier with the result that the relatively heavier liquid in the syphoning cooler second conduit item 9 pushes the hotter liquid in the first conduit and third conduit on into the reservoir item 10. Later, as the day progresses, sun enters the westward-leaning reflector item 1 which with its absorber item 6, hotter third conduit item 11 and second, cooler conduit item 8 functions exactly as the eastward-leaning reflector and its conduits. Thus, heated liquid has been put in storage without pumping. The period during the day during which both reflectors with respective conduits are simultaneously functional as well as the total daily period of functioning is fixed when the angle item 5 is chosen. The fraction from 1.0 to less than 1.0 of the year during which the embodiment functions is determined by the angle of lean item 13.

I claim:

1. A concentrating solar collector apparatus comprising:

at least two solar concentrators, each concentrator having a reflector trough-shape in cross-section and having an extended length;

the lengths of the troughs extend generally North and South and for each trough, a line perpendicular to the longitudinal centerline of a trough cross-section lays perpendicular to a line along the length of that trough and the line along the length of that trough and the line perpendicular to the longitudinal centerline of said trough cross-section define a plane along which lays the base of that trough;

said planes are situated such that the open end of the trough cross-section of each reflector is orientated away from that of the other reflector such that an included angle of less than 180 degrees is formed between the two planes on the underside thereof;

the line of intersection of the two planes is angled upwardly from the horizontal at an angle which is fixed for performance over some fraction of the year and is adjustable for greater performance;

the upper end of said apparatus is pointed substantially northward when located in the northern hemisphere and substantially southward when located in the southern hemisphere and there will be at least one set of intersecting planes and their respective concentrators and wherein absorber-converter means is located within the cavity of each reflector and communicates with energy-receiving means.

2. A concentrating solar collector apparatus as in claim 1 wherein each concentrator consists of a reflector and an absorber means wherein the absorber is a first conduit for fluid and wherein a second conduit feeds cooler fluid from an energy-receiving reservoir means to the lower extremities of the first conduit and wherein a third conduit transfers hotter fluid from the upper extremities of the first conduit to the energy-receiving reservoir means.

* * * * *